United States Patent [19]

Valkenburg

[11] Patent Number: 4,601,538
[45] Date of Patent: Jul. 22, 1986

[54] LIGHT REFLECTING SAFETY BELT

[76] Inventor: Arie Valkenburg, Bergweg 12, 3911 VB Rhenen, Netherlands

[21] Appl. No.: 611,717

[22] Filed: May 18, 1984

[30] Foreign Application Priority Data

May 27, 1983 [NL] Netherlands ............ 8301902

[51] Int. Cl.[4] ............................................. G02B 5/128
[52] U.S. Cl. ..................................................... 350/98
[58] Field of Search ..................................... 350/97, 98

[56] References Cited

U.S. PATENT DOCUMENTS 3,276,416 10/1966 Dirhs et al. ............................ 350/98
4,091,766 5/1978 Colliard ................................. 350/98

Primary Examiner—Bruce Y. Arnold
Attorney, Agent, or Firm—Kane, Dalsimer, Kane, Sullivan and Kurucz

[57] ABSTRACT

The invention relates to a light reflecting safety belt. According to the invention this safety belt comprises two cooperating portions of a touch and close fastening, which portions are connected to each other at one of their ends, the operative face of the one fastening portion lying at the one side of the safety belt, while the operative face of the other fastening portion lies on the other side of the safety belt, one side of the safety belt being provided with at least one light reflecting strip-shaped portion, which extends over the whole length, but only over a part of the width of the safety belt.

9 Claims, 2 Drawing Figures

US Patent  Jul. 22, 1986  4,601,538
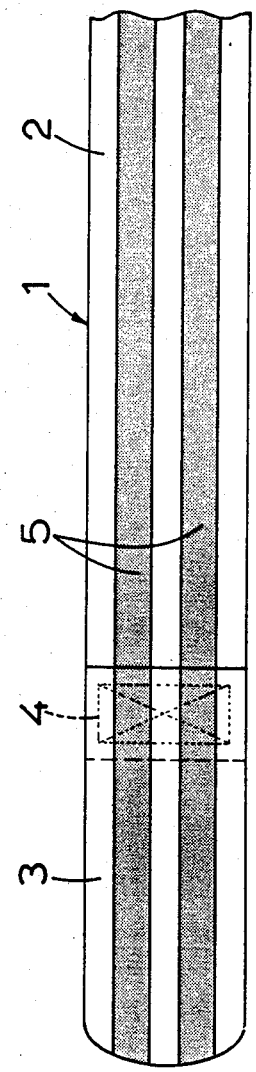
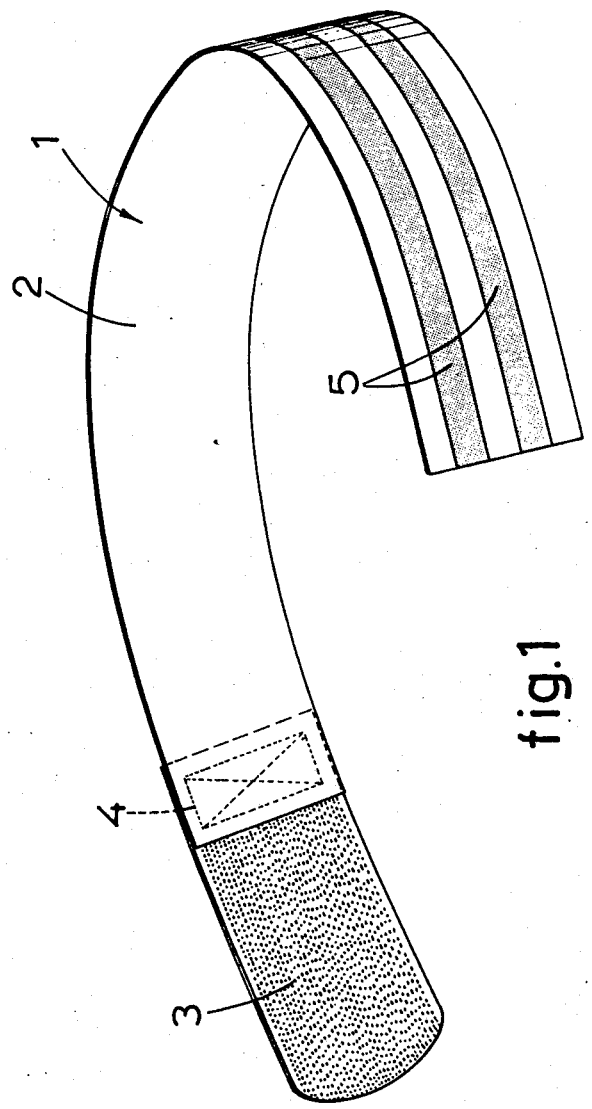

LIGHT REFLECTING SAFETY BELT

The invention relates to a light reflecting safety belt.

Light reflecting safety belts are already known and are worn by pedestrians and cyclists around an arm or another part of the body, in order to be clearly visible in the traffic during the evening and the night, so as to reduce traffic accidents.

The known light reflecting safety belts comprise a non elastic belt portion and an elastic belt portion, so that the length of the safety belt may be somewhat varied in order to enable this safety belt to be applied around an arm or another part of the body in a rather tight manner, so as to prevent the safety belt from being lost. However, these known safety belts show the disadvantage that the variation in length which is possible is not enough to be able to always apply the light reflecting safety belt around the arm or another part of the body in a sufficiently tight manner. For this reason it is necessary with the known construction of the safety belts to manufacture these safety belts in different lengths and to keep a supply of these different lengths in stock. Further, in general, it is not possible with these known light reflecting safety belts to make them light reflecting over their whole length.

It is an object of the present invention to provide a light reflecting safety belt, wherein these disadvantages are removed in a simple but nevertheless effective manner.

For this purpose the light reflecting safety belt according to the invention is characterized in that the same comprises two cooperating portions of a touch and close fastener, which portions are connected to each other at one of their ends, the operative face of the one fastener portion lying at the one side of the safety belt, while the operative face of the other fastener portion lies on the other side of the safety belt, one side of the safety belt being provided with at least one light reflecting strip-shaped portion, which extends over the whole length, but only over a part of the width of the safety belt.

This safety belt can always be applied in a tight manner around the arm or another part of the body by engaging the two portions of the touch and close fastener with each other. Further, the light reflecting strip-shaped portion extends over the whole outer side of the safety belt, which is of great importance from a point of view of safety.

The invention will hereafter be elucidated with reference to the drawing.

FIG. 1 is a perspective view of an embodiment of the light reflecting safety belt according to the invention.

FIG. 2 is a side view of a part of the light reflecting safety belt according to FIG. 1.

The light reflecting safety belt 1 shown in the drawing is composed of two touch and close fastener portions 2, 3, which are connected with each other at one of their ends.

The connection of the two fastener portions 2, 3 may be effected by stitching, as schematically indicated in the drawing with a dashed line 4. However, other connecting methods are also possible; in particular a connection by means of ultrasonic sealing has given excellent results.

In the embodiment of the safety belt as shown in the drawing by way of example the fastener portion 2 is provided with loops, while the fastener portion 3 is provided with hooks, mushrooms or the like means, which cooperate with the loops of the fastener portion 2.

The operative face of the fastener portion 2 lies at the front side in FIG. 2, while the operative face of the fastener portion 3 is visible in FIG. 1. The operative faces of the two fastener portions 2, 3 are positioned at opposite sides of the safety belt 1.

One side of the safety belt 1 is provided with at least one light reflecting strip-shaped portion 5, which extends over only a part of the width, but over the whole length of the safety belt 1 and which, in the embodiment shown in the drawing, is applied on the operative face of the fastener portion 2 provided with loops and on the inoperative face of the fastener portion 3.

In this embodiment the fastener portions 2, 3 comprise two parallel light reflecting strip-shaped portions 5, which lie at a distance from the upper edges and from the lower edges of the fastener portions 2, 3. In this way a strip-shaped pattern is obtained, which is clearly visible in the traffic at night. Of course the safety belt 1 may also contain only one, or three or more light reflecting strip-shaped portions 5 in dependency of the width of the safety belt 1 and the width of the light reflecting strip-shaped portions 5.

As shown in the drawing the fastener portions 2 and 3 have lengths which considerably differ from each other. The length of the fastener portion 2, which is provided with loops is much larger than the length of the fastener portion 3. This fastener portion 3 has only a rather short length. As visible in the drawing the widths of both fastener portions 2 and 3 are at least substantially equal.

Due to the fact that the light reflecting strip-shaped portions 5 extend only over a portion of the width of the light reflecting safety belt 1, the fastener portions 2, 3 may be coupled at any desired location, while a free end part of the fastener portion 2, if present, will come to lie at the inner side of the safety belt 1, so that no loose end part is present.

The invention is not restricted to the embodiment shown in the drawing by way of example, which may be varied in several ways within the scope of the invention.

I claim:

1. A light-reflecting safety belt comprising:
   a first fastening portion;
   a second fastening portion fixedly connected to the first fastening portion at one end, wherein the first and second fastening portions form substantially the entire safety belt;
   the safety belt having first and second sides, the operative face of the first fastening portion being on the first side of the belt, the operative face of the second fastening portion being on the second side of the belt; and
   at least one light-reflecting strip-shaped portion on one side of the safety belt which extends over the entire length of the safety belt, but only over a part of the width of the safety belt, said light-reflecting portion positioned on the operative face of one of the fastening portions and on the inoperative face of the other fastening portion.

2. Light reflecting safety belt according to claim 1, characterized in that the light reflecting strip-shaped portion is positioned on the operative face of the first fastening portion, which is provided with loops and on the inoperative face of the second fastening portion.

3. Light reflecting safety belt according to claim 1 characterized in that one of the two fastening portions has only a rather short length.

4. Light reflecting safety belt according to claim 3, characterized in that the length of the fastening portion which is provided with loops is much larger than the length of the other fastening portion.

5. Light reflecting safety belt according to any one of the claims 1, 2, 3 or 4, characterized in that the widths of the two fastening portions are at least substantially equal.

6. A light-reflecting safety belt comprising:
a first fastening portion;
a second fastening portion fixedly connected to the first fastening portion at one end, wherein the first and second fastening portions form substantially the entire safety belt;
the safety belt having first and second sides, the operative face of the first fastening portion being on the first side of the belt, the operative face of the second fastening portion being on the second side of the belt; and
at least one light-reflecting strip-shaped portion on one side of the safety belt which extends over the entire length of the safety belt, but only over a part of the width of the safety belt, said light-reflecting portion being positioned on the operative face of one of the fastening portions and on the inoperative face of the other fastening portion;
wherein the two fastener portions are connected with each other by means of ultrasonic sealing.

7. A light-reflecting safety belt comprising:
a first fastening portion;
a second fastening portion fixedly connected to the first fastening portion at one end, wherein the first and second fastening portions form substantially the entire safety belt;
the safety belt having first and second sides, the operative face of the first fastening portion being on the first side of the belt, the operative face of the second fastening portion being on the second side of the belt; and
at least one light-reflecting strip-shaped portion on one side of the safety belt which extends over the entire length of the safety belt, but only over a part of the width of the safety belt, said light-reflecting portion being positioned on the operative face of one of the fastening portions and on the inoperative face of the other fastening portion;
wherein at least one fastening element of the first fastening portion and the light-reflecting portion are interposed across the width of the belt on the first side of the belt for the entire length of the first fastening portion.

8. A light-reflecting belt according to claim 7 wherein the light-reflecting portion on the first side of the belt continues longitudinally without interruption on the inoperative side of the second fastening portion and is interposed across the width of the belt with at least one strip of material having the same color as the fastening element of the first fastening portion.

9. A light-reflecting belt according to claim 7 or 8 comprising three fastening elements and two light-reflecting portions each interposed parallel to one another.

* * * * *